United States Patent
Deprez et al.

(10) Patent No.: US 10,836,194 B2
(45) Date of Patent: Nov. 17, 2020

(54) METHOD FOR CURING OF AN INK OR TONER LAYER AND PRINTING SYSTEM WITH CURING UNIT

(71) Applicant: XEIKON MANUFACTURING N.V., Lier (BE)

(72) Inventors: Lode Erik Dries Deprez, Wachtebeke (BE); Wout Victor Maria Vervoort, Ravels (BE); Herman Jan Godelieve Van De Straete, Deurne (BE); Nick Horemans, Noorderwijk (BE); Wouter Bart Tinne Leus, Rumst (BE)

(73) Assignee: XEIKON MANUFACTURING N.V., Lier (BE)

( * ) Notice: Subject to any disclaimer, the term of this patent is extended or adjusted under 35 U.S.C. 154(b) by 0 days.

(21) Appl. No.: 16/614,494

(22) PCT Filed: May 17, 2018

(86) PCT No.: PCT/EP2018/062993
§ 371 (c)(1),
(2) Date: Nov. 18, 2019

(87) PCT Pub. No.: WO2018/215310
PCT Pub. Date: Nov. 29, 2018

(65) Prior Publication Data
US 2020/0070555 A1  Mar. 5, 2020

(30) Foreign Application Priority Data

May 22, 2017 (NL) ..................................... 2018960
Jun. 30, 2017 (NL) ..................................... 2019152

(51) Int. Cl.
*C09D 11/101* (2014.01)
*B41J 11/00* (2006.01)
(Continued)

(52) U.S. Cl.
CPC .......... *B41M 5/0023* (2013.01); *B41J 11/002* (2013.01); *B41M 7/0081* (2013.01);
(Continued)

(58) Field of Classification Search
CPC ........ B41J 11/002; C09D 11/30; C09D 11/54; C09D 11/101; B41M 5/0023;
(Continued)

(56) References Cited

U.S. PATENT DOCUMENTS 8,646,901 B2 * 2/2014 De Meutter ........... B41M 7/009
347/102
2006/0075917 A1 * 4/2006 Edwards ................ B41J 11/002
101/483
(Continued)

FOREIGN PATENT DOCUMENTS

EP   3132937 A1   2/2017
JP   2014076639 A   5/2014
(Continued)

OTHER PUBLICATIONS

International Search Report and Written Opinion for the International Patent Application No. PCT/ EP2018/062993, dated Jun. 15, 2018, 15 pages.

*Primary Examiner* — Anh T Vo (57) ABSTRACT

A method for curing of an actinic light sensitive ink or toner layer on a substrate includes irradiating the actinic light sensitive ink or toner layer with a first radiation dose D1 in a first spectral range between 320 nm and 445 nm, followed by a second radiation dose D2 in a second spectral range between 200 nm and 319 nm. The ratio D1/D2 of the first radiation dose and the second radiation dose is between 0.25 and 500, more preferably between 0.25 and 200, even more preferably between 0.50 and 100.

20 Claims, 6 Drawing Sheets

(51) Int. Cl.
*B41M 5/00* (2006.01)
*B41M 7/00* (2006.01)
*C09D 11/30* (2014.01)
*G03G 9/08* (2006.01)
*G03G 9/087* (2006.01)
*G03G 9/13* (2006.01)
*C09D 11/54* (2014.01)

(52) U.S. Cl.
CPC ............ *C09D 11/101* (2013.01); *C09D 11/30* (2013.01); *C09D 11/54* (2013.01); *G03G 9/0802* (2013.01); *G03G 9/08793* (2013.01); *G03G 9/13* (2013.01)

(58) Field of Classification Search
CPC ..... B41M 7/0081; G03G 9/0802; G03G 9/13; G09G 9/08793
See application file for complete search history.

(56) References Cited

U.S. PATENT DOCUMENTS

| | | | |
|---|---|---|---|
| 2008/0068431 A1 | 3/2008 | Yokoyama | |
| 2008/0081116 A1* | 4/2008 | Makuta | B41M 5/0011 427/372.2 |
| 2010/0066791 A1* | 3/2010 | Jeremic | B41J 11/002 347/102 |

FOREIGN PATENT DOCUMENTS

| | | |
|---|---|---|
| WO | 2010150023 A2 | 12/2010 |
| WO | 2015028355 A1 | 3/2015 |
| WO | 2017038566 A1 | 3/2017 |

* cited by examiner

FIG. 7

METHOD FOR CURING OF AN INK OR TONER LAYER AND PRINTING SYSTEM WITH CURING UNIT

This is a national stage application filed under 35 U.S.C. § 371 of pending international application PCT/EP2018/062993 filed May 17, 2018, which claims priority to Netherlands Patent application NL2018960, filed May 22, 2017 and Netherlands Patent application NL2019152, filed Jun. 30, 2017, the entirety of which applications are hereby incorporated by reference herein.

FIELD OF INVENTION

The field of the invention relates to printing with energy-curable inks or toners. Particular embodiments relate to a method for curing of an actinic light sensitive ink or toner layer on a substrate, and to printing systems implementing such a method.

BACKGROUND

Printing with energy-curable inks or with energy-curable dry or liquid toners is known. Developments in this field have focused on a more effective and efficient curing of the ink or toner after it has been deposited onto a substrate.

A first type of known energy-curable inkjet printing systems uses mercury (vapour) bulbs. These bulbs are capable of producing one or more peak intensities (W/cm$^2$) and doses of UV radiation (J/cm$^2$) in a variety of wavelengths. UV radiation is categorized based on the emitted wavelength. The following categories can be distinguished: UV radiation subtype A (UVA: 320-390 nm), UV radiation subtype B (UVB: 280-320 nm), UV radiation subtype C (UVC: 200-280 nm), UV radiation subtype V (UVV: 390-445 nm). Photoinitiators distributed throughout the ink are able to capture the UV photons emitted by the bulbs. The photoinitiators decompose into free radicals when exposed to light, which promotes cross-linking at the surface of the ink layer and within the bulk of the ink layer.

Doping the bulbs with small amounts of iron, gallium, etc. may change the distribution of the UV wavelengths emitted by the bulbs. Higher wavelengths can be beneficial for improving the depth at which the curing takes place.

Drawbacks of bulbs are the high operation temperature (bulb surface can reach 650-900° C.), which imparts heat to the substrate through the emission of a large amount of infrared radiation. These temperatures can cause problems, especially if the substrate is polymeric, thin or heat-sensitive. Various technologies have been used in an effort to reduce the temperature emitted by the bulbs, including dichroic reflectors and air and/or water cooling systems.

Advancements in UV light emitting diode (LED) technologies have overcome some of the shortcomings associated with medium pressure mercury bulbs. UV LEDs have a relatively limited wavelength range, typically UVA and UVV, e.g. 405 nm, 395 nm, 385 nm, 365 nm, but LEDs exhibit a high peak intensity. UV LEDs have the advantage of having lower power consumption and much longer lifetimes. UV LEDs are used in conjunction with special ink formulations, which result in much lower heat output, and hence in a wider range of potential substrates. However, at the available wavelength ranges limited curing occurs at the surface of the ink. Also, the curing is limited by oxygen radicals present at the surface of the ink, which inhibit network formation and cross-linking. Existing solutions have tried to reduce and/or eliminate oxygen present near the surface of the ink layer by using e.g. a nitrogen "blanket" to reduce or eliminate the presence of oxygen. Sometimes temporary (counter) foils are used for the same purpose. However, such solutions require additional components and sufficient space for creating such a nitrogen blanket or short time reversible lamination. Other solutions modify the composition of the ink to increase the surface cure of the ink, even in the presence of oxygen. By choosing the right photo-initiators, both the desired surface cure and the through cure can be achieved with LED curing; however, yellowing of the ink after irradiation is likely to occur by fragments and/or recombined fragments of the photo-initiator. This can be overcome by using very complex photo-initiators which make the ink very expensive. To conclude, combining the advantages of UV-LEDs in absence of yellowing at an acceptable cost is difficult with existing technologies.

WO 2016/144839 A1 discloses a printing system that can be used to increase the surface and depth cure of ink formulations, including UV-curable inks, by exposing recently-deposited ink to two light sources: a first light source configured to emit one or more wavelengths of UVC radiation; followed by a second light source configured to emit one or more wavelengths of UVA, UVB or UVV radiation. The substrate is configured such that ink deposited by the printer head is exposed to the first light source prior to the second light source. It is explained that, because of the shorter UVC wavelengths and high energy of the first light source, the radiation is generally unable to penetrate deeply into the ink layer, but can prove effective at curing the upper level of the ink layer. It is further explained that because of the longer wavelengths and the lower energy of the second light source, the radiation of the second light source is capable of penetrating deeper into the energy curable ink layer. In the disclosed printing system the printer head, the first light source and the second light source are coupled in a carriage coupled to a rail allowing the carriage to pass over the substrate.

SUMMARY

Embodiments of the invention aim at providing an improved method for curing an ink or toner layer on a substrate, and in particular a method allowing to reduce the heat that is being generated and to reduce the amount of oxygen present at the surface of the ink or toner layer when performing surface curing, preferably without the need for complicated components and expensive inks or toners with complex photo-initiators, whilst avoiding an unacceptable yellow shift after the curing is done. According to a first aspect of the invention there is provided a method for curing of an actinic light sensitive ink or toner layer on a substrate comprising an irradiating step of irradiating the actinic light sensitive ink or toner layer, with a first radiation dose D1 in a first spectral range between 320 nm and 445 nm; followed by a second radiation dose D2 in a second spectral range between 200 nm and 319 nm.

The first spectral range may correspond to at least one of the group consisting of UVA light and UVV light. The second spectral range may correspond to at least one of the group consisting of UVB light and UVC light.

UVV corresponds with a wavelength range of 390 nm-445 nm, UVA with 320 nm-390 nm, UVB with 280 nm-320 nm, UVC with 200 nm-280 nm.

Preferably, the ratio D1/D2 of the first radiation dose and the second radiation dose is between 0.25 and 500, more preferably between 0.25 and 200, even more preferably between 0.50 and 100.

Embodiments are based inter alia on the inventive insight that the longer wavelengths of the first radiation at a suitable first radiation dose can penetrate deeper into the ink or toner layer and can reduce the amount of oxygen present at the surface of the ink or toner layer. The reduced amount of oxygen allows for an improved surface curing by the second radiation dose. Indeed, the shorter wavelengths of the second radiation result in a surface curing, and in view of the reduced amount of oxygen present at the surface, this surface curing will be improved compared to prior art surface curing where oxygen is present at the surface. Also, the dose (and hence the power) needed to perform the surface curing can be reduced without the use of external nitrogen or carbon dioxide gas flows. This results also in less heat being generated, such that the method of the invention can be performed on a wide variety of substrates including heat sensitive substrates. Also, the method may be performed with less ozone generation, less migration and less yellowing due to a more efficient curing without having to change the ink or toner formulation. The odour is also very much reduced due to the high efficiency of these two irradiating steps.

Preferably, the first radiation dose D1 in the first spectral range comprises both UVA light and UVV light. In that manner a good curing can be obtained of a deeper bottom portion of the ink or toner layer, also when the ink layer comprises white, yellow or black ink.

Preferably, the second radiation dose in the second spectral range comprises both UVB and UVC light. In that manner a good curing can be obtained of a surface portion of the ink or toner layer.

Preferably, the first and the second dose are such that the ink or toner layer is fully cured. The terms "partial curing" and "full curing" refer to the degree of curing, i.e, the percentage of converted functional groups, and may be determined by for example RT-FTIR (Real-Time Fourier Transform Infra-Red Spectroscopy), a method well known to the one skilled in the art of curable formulations or by physical or chemical testing methods (e.g. scratch resistance or chemical resistance towards solvents).

An ink or toner layer that is fully cured means that the surface cure, as well as the depth/through cure and the substrate adhesive cure have taken place. The through cure can be checked for example by a scratch test to verify the adhesion of the ink or toner layer onto the substrate and the surface cure can be checked for example by visual observation of deposition of not fully/partially cured ink or toner layer by rollers downstream the curing on the substrate unit (so called "offset") or by checking the coloration of a MEK soaked cloth pad after rubbing the image. These test methods are described in more detail below.

According to an exemplary embodiment, the irradiating step comprises a first radiation stage for applying the first radiation dose D1 and a second radiation stage for applying the second radiation dose D2; and the first radiation stage starts earlier than the second radiation stage. The second radiation stage may start during the first radiation stage or substantially directly after the end of the first radiation stage, but always after the start of the first radiation stage, preferably at least 0.1 s after the start of the first radiation stage. In other words, the application of the first and the second radiation dose may partially or fully overlap, seen in a time dimension, as long as the application of the first radiation dose has started before the application of the second radiation dose. Preferably, the first radiation dose D1 of the first radiation stage is predominantly applied onto the actinic light sensitive layer before a start of the second radiation stage. In that manner the effect of the reduced oxygen at the surface when applying the second radiation dose D2, can be optimized.

Preferably the irradiating step is performed while ambient air is present at the actinic light sensitive layer. In other words, an embodiment of the method may be performed without using a nitrogen, noble gas or carbon dioxide blanket, since the application of the first radiation dose D1 will result in a reduced amount of oxygen at the surface.

Preferably, the first radiation dose D1 is at least 30 mJ/cm2, more preferably at least 100 mJ/cm2, even more preferably at least 300 mJ/cm2, e.g. at least 500 mJ/cm2. Preferably the second radiation dose D2 is at least 20 mJ/cm2, more preferably at least 30 mJ/cm2. Preferably the second radiation dose D2 is lower than 200 mJ/cm2, e.g. lower than 100 mJ/cm2. The relatively high first dose D1 is advantageous to obtain a good curing of a deeper bottom portion of the ink or toner layer. The second dose D2 is preferably not too high to limit the temperature increase. Preferably, the second dose D2 is chosen such that the temperature increase of the non-printed substrate is smaller than 30-40° C., preferably lower than 20-30° C. and most preferably lower than 20° C., e.g. lower than 15° C.

In an exemplary embodiment, the first radiation dose D1 is applied by using at least one UV-LED device. Preferably, a peak power density of the at least one UV-LED device at a front glass thereof is at least 10 W/cm2, preferably at least 16 W/cm2. Such UV-LED devices have the advantage that a sufficiently high first radiation dose may be generated in the first spectral range.

In an exemplary embodiment, the second radiation dose D2 is applied using a discharge lamp, preferably a mercury discharge lamp. Such lamps are suitable for generating UVB and UVC light in a very constant and stable way. Further, in view of the application of a first radiation dose, the discharge lamp may be operated at a lower power level, resulting in less heat being generated. Preferably, the input power per unit width of the discharge lamp on the substrate is at most 150 W/cm, more preferably at most 120 W/cm, even more preferably at most 80 W/cm, e.g. at most 50 W/cm. These values are suitable values for printing speeds of up to 1 m/s; for higher printing speeds the input power per unit width may be higher. Embodiments of the invention allow using regular Fe-doped or other metal doped Hg curable inks using less energy and hence less heat generation. Also, photoinitiators that do not change colour after being exposed to UV light may be used. It is noted that the discharge lamp may also emit UVA and/or UVV light. However, this portion may be much smaller than the first radiation dose D1 applied by the at least one UV-LED device.

In an exemplary embodiment, the actinic light sensitive ink layer is formed in a deposition step of positioning inkjet droplets onto the substrate before the irradiating step. The deposited inkjet droplets comprise at least one of cyan droplets, magenta droplets, yellow droplets, white droplets and black droplets. Depending on the characteristics of the ink and the used pigments the through/depth cure may be affected. For example, when less transparent pigments such as for example black pigment or certain yellow pigments are used, the through/depth cure will be negatively affected. Therefore embodiments of the invention are particularly beneficial for multilayers containing black and yellow, but can also be very beneficial for thicker layers of white. In an exemplary embodiment, the method further comprises a pinning step comprising irradiating a partially formed actinic light sensitive inkjet ink layer using a radiation dose D3 of UV light for substantially immobilising the deposited inkjet droplets on the substrate, which pinning step is preferably performed in between a first deposition step of applying a first set of inkjet droplets having a first colour, onto the substrate and a second deposition step of applying a second set of inkjet droplets having a second colour onto the substrate, preferably the second colour being different from the first colour. In that manner a partial curing of the first set of inkjet droplets is performed in order to substantially immobilize the first set of inkjet droplets before applying the second set of inkjet droplets.

In other embodiments, the actinic light sensitive toner may be a dry or liquid toner. The liquid toner may be a liquid toner with an actinic light sensitive carrier liquid. To render the carrier liquid UV curable photo-initiators may be added. Examples of suitable carrier liquids to which photo-initiators may be added are described in patent applications PCT/EP2017/059809 or NL 2016697 in the name of the applicant, which are included herein by reference. In other embodiments, the liquid toner may be a liquid toner with UV curable marking particles, wherein the marking particles are UV cured and the carrier liquid is removed from the printed substrate. An example of such a toner is described in patent application NL2016429 in the name of the applicant, which is included herein by reference. The radiation curable dry toner may be a dry toner as described in patent applications EP 1 437 628 A1, EP 1 756 675 B1, EP 1 930 780 B1, or EP 2 019 340 B1 in the name of the applicant, which are included herein by reference.

According to another aspect of the invention there is provided a printing system for printing and curing of an actinic light sensitive layer on a substrate comprising:
  a print assembly configured for depositing ink or toner onto the substrate thereby forming the actinic light sensitive layer on the substrate;
  a substrate transport mechanism for moving the substrate in a transport direction along the print assembly; and
  a curing unit for performing an irradiating step for curing the actinic light sensitive layer by irradiating the formed actinic light sensitive layer with a combination of a first radiation dose D1 in a first spectral range between 320 nm and 445 nm; followed by a second radiation dose D2 in a second spectral range between 200 nm and 319 nm; wherein the ratio of the radiation dose D1/D2 is between 0.25 and 500, more preferably between 0.25 and 200, even more preferably between 0.50 and 100; wherein the curing unit is arranged downstream of the print assembly seen in the transport direction.

The print assembly may be a print head assembly for performing inkjet printing or a print assembly configured for printing with dry or liquid curable toner. More in particular, when printing with liquid toner, the printing assembly may have the features disclosed in patent applications PCT/EP2017/059809 or NL 2016697 in the name of the applicant, which are included herein by reference, wherein the curing unit is then a UV curing unit as described above and wherein the carrier liquid is UV curable.

In an exemplary embodiment the curing unit comprises a first curing device arranged for emitting a first irradiation onto the formed actinic light sensitive layer and a second curing device arranged for emitting a second irradiation onto the formed actinic light sensitive layer downstream of the first curing device, wherein the first curing device is configured to emit the first irradiation dose, and the second curing device is configured to emit the second irradiation dose D2.

Preferably the time between the end of the first irradiation and beginning of the second irradiation is smaller than 0.5 seconds. As explained above, the second irradiating stage may start also before the end of the first irradiating stage but after the beginning of the first irradiating stage, preferably at least 0.1 second later than the beginning of the first irradiating stage.

In an exemplary embodiment the print assembly comprises at least one of a print head for depositing cyan droplets, a print head for depositing magenta droplets, a print head for depositing yellow droplets, a print head for depositing black droplets, a print head for depositing white droplets.

The advantages and features disclosed above for the method apply mutatis mutandis for the printing system.

According to embodiments of the invention, the method and printing system have the features of any one of the following clauses:

1. A method for curing of an actinic light sensitive ink or toner layer on a substrate comprising an irradiating step of irradiating the actinic light sensitive ink or toner layer, with a first radiation dose D1 in a first spectral range between 320 nm and 445 nm; followed by a second radiation dose D2 in a second spectral range between 200 nm and 319 nm, wherein the ratio D1/D2 of the first radiation dose and the second radiation dose is between 0.25 and 500, more preferably between 0.25 and 200, even more preferably between 0.50 and 100.

2. The method of clause 1, wherein the first and the second dose are such that the ink or toner layer is fully cured.

3. The method of clause 1 or 2, wherein the first radiation dose D1 in the first spectral range comprises both UVA light and UVV light.

4. The method of any one of the previous clauses, wherein the second radiation dose in the second spectral range comprises both UVB and UVC light.

5. The method of any one of the previous clauses, wherein the irradiating step comprises a first radiation stage for applying the first radiation dose D1 and a second radiation stage for applying the second radiation dose D2; and wherein the first radiation stage starts earlier than the second radiation stage.

6. The method of the preceding clause, wherein the first radiation dose D1 of the first radiation stage is predominantly applied onto the actinic light sensitive ink or toner layer before a start of the second radiation stage.

7. The method according to clause 5 or 6, wherein the second radiation stage starts during or substantially directly after the end of the first radiation stage.

8. The method according to any one of the preceding clauses, wherein the irradiating step is performed while ambient air is present the actinic light sensitive ink or toner layer.

9. The method according to any of the preceding clauses, wherein the first radiation dose D1 is at least 30 mJ/cm2, preferably at least 100 mJ/cm2; and/or wherein the second radiation dose D2 is at least 20 mJ/cm2, preferably at least 30 mJ/cm2.

10. The method according to any of the preceding clauses, wherein the first radiation dose D1 is applied by using at least one UV-LED device.

11. The method according to the preceding clause, wherein a peak power density of the at least one UV-LED device at a front glass thereof is at least 10 W/cm2, preferably at least 16 W/cm2.

12. The method according to any one of the preceding clauses, wherein the second radiation dose D2 is applied using a discharge lamp, preferably a mercury discharge lamp.

13. The method according to any of the preceding clauses, wherein the actinic light sensitive layer is an actinic light sensitive inkjet ink layer which is formed in a deposition step of positioning inkjet droplets onto the substrate before the irradiating step, the deposited inkjet droplets comprising at least one of cyan droplets, magenta droplets, yellow droplets, black droplets, white droplets.

14. The method according to the preceding clause, wherein the method further comprises a pinning step comprising irradiating a partially formed actinic light sensitive inkjet ink layer using a radiation dose D3 of UV light for substantially immobilising the deposited inkjet droplets on the substrate, which pinning step is preferably performed in between a first deposition step of applying a first set of inkjet droplets having a first colour, onto the substrate and a second deposition step of applying a second set of inkjet droplets having a second colour onto the substrate, preferably the second colour being different from the first colour.

15. A printing system for printing and curing of an actinic light sensitive layer on a substrate comprising:
a. a print assembly configured for depositing ink or toner onto the substrate thereby forming the actinic light sensitive layer on the substrate;
b. a substrate transport mechanism for moving the substrate in a transport direction along the print assembly; and
c. a curing unit configured for performing an irradiating step for curing the actinic light sensitive layer by irradiating the formed actinic light sensitive layer with a combination of a first radiation dose D1 in a first spectral range between 320 nm and 445 nm; followed by a second radiation dose D2 in a second spectral range between 200 nm and 319 nm, wherein the ratio of the radiation dose D1/D2 is between 0.25 and 500, more preferably between 0.25 and 200, even more preferably between 0.50 and 100, wherein the curing unit is arranged downstream of the print assembly seen in the transport direction.

16. The printing system according to the preceding clause, wherein the curing unit comprises a first curing device arranged for emitting a first irradiation onto the formed actinic light sensitive layer and a second curing device arranged for emitting a second irradiation onto the formed actinic light sensitive layer downstream of the first curing device, wherein the first curing device is configured to emit the first radiation dose, and the second curing device is configured to emit the second irradiation dose D2.

17. The printing system according to the preceding clause, wherein the first curing device comprises at least one UV-LED device.

18. The printing system according to the preceding clause, wherein a peak power density of the at least one UV-LED device at a front glass thereof is at least 10 W/cm2, preferably at least 16 W/cm2.

19. The printing system according to any one of the clauses 18-20, wherein the second curing unit comprises a discharge lamp, preferably a mercury discharge lamp.

20. The printing system according to any one of the preceding clauses 15-19, wherein the print assembly comprising at least one of a print head for depositing cyan droplets, a print head for depositing magenta droplets, a print head for depositing yellow droplets, a print head for depositing black droplets and a print head for depositing white droplets.

21. The printing system according to the preceding clause, further comprising a pinning device configured for irradiating a partially formed actinic light sensitive layer using a radiation dose D3 of UV light for substantially immobilising the deposited ink on the substrate, which pinning device is preferably arranged in between two subsequent print heads of the print assembly.

22. The method according to any one of the clauses 1-12, wherein the actinic light sensitive ink or toner layer is a liquid or dry toner layer.

In preferred embodiments the printing system is a single-pass printing system, i.e. a system which does not perform scanning in a direction perpendicular on the transport direction of the substrate through the printing system. Preferably, the substrate is transported at a substantially constant speed through the printing system, preferably a speed of more than 50 cm/s, e.g. between 0.5 and 5 m/s, so as to enable high-speed printing.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
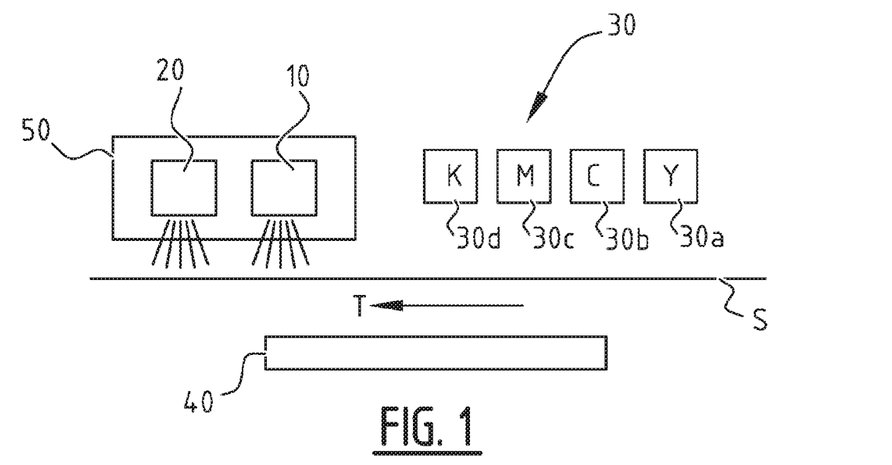
FIG. 1 is a schematic view of an exemplary embodiment of an inkjet printing system in accordance with the invention.

FIG. 1 illustrates a first exemplary embodiment of a printing system for printing and curing of an actinic light sensitive ink layer on a substrate. The printing system comprises a print head assembly 30, a substrate support mechanism 40, and a curing unit 50. The print head assembly 30 is configured for depositing ink droplets onto the substrate S, thereby forming an actinic light sensitive ink layer on the substrate. In the illustrated exemplary embodiment, the print head assembly 30 comprises a first print head 30*a* for depositing yellow droplets, a second print head 30*b* for depositing cyan droplets, a third print head 30*c* for depositing magenta droplets, and a fourth print head 30*d* for depositing black droplets. This is merely an exemplary embodiment and the skilled person understands that it is also possible to include print heads for more or less colours or to change the colour sequence. The substrate transport mechanism 40 is configured for moving the substrate S with respect to the print head assembly 30, in the transport direction T.

The curing unit 50 comprises a first curing device 10 and a second curing device 20 arranged downstream of the first curing device 10, seen in the transport direction T. The first curing device 10 is configured for emitting a first irradiation onto the formed actinic light sensitive inkjet layer deposited on the substrate S by the print head assembly 30. The first irradiation comprises radiation in a spectral range between 320 and 445 nm, and is intended to generate the first radiation dose D1. Only the dose in the 320-445 nm spectral range is taken into account for calculating the first dose D1 although the first curing device can also emit in a broader spectral range than 320-445 nm. The second curing device 20 is arranged for emitting a second irradiation onto the formed actinic light sensitive ink layer downstream of the first curing device 10, seen in the transport direction. Preferably, the second curing device 20 is configured to emit the second radiation dose D2 in a spectral range between 200 and 319 nm. Preferably, the first spectral range comprises UVA light and UVV light. Preferably, the second spectral range comprises UVB light and UVC light. A suitable first curing device is e.g. a UV LED device configured to emit radiation in the UVA and UVV spectral range. Preferably, the second curing device is a mercury discharge lamp. The mercury discharge lamp may be a Fe—Hg discharge lamp. A mercury discharge lamp can emit a sufficient radiation dose in the UVB and UVC spectral range. It is noted that a discharge lamp emits typically also UVA and/or UVV light.

Preferably, the ratio D1/D2 of the first radiation dose and the second radiation dose is between 0.25 and 500, more preferably between 0.25 and 200, even more preferably between 0.50 and 100. The longer wavelengths of the first radiation emitted by the first curing device 10 and the higher first radiation dose D1 allow to penetrate deeper into the ink layer and also to reduce the amount of oxygen present at the surface of the ink layer due to an amount of radicals that are generated during the first exposure which react with the oxygen. This reduces the amount of inhibiting oxygen in the surface of the layer. Additionally because of the short time between the first and the second exposure, diffusion and absorption of new oxygen is reduced or prevented. Both aspects allow for an improved surface curing by the second curing device 20 with less energy in UVC and UVB. Indeed, the shorter wavelengths of the second radiation emitted by the second curing device 20 result in a surface curing, and in view of the reduced amount of oxygen present at the surface, this surface curing will be improved compared to prior art surface curing where oxygen is present at the surface. Also, the second dose D2 (and hence the power P2) which is needed to perform the surface curing by the second curing device 20 can be reduced. This results in less heat being generated, such that exemplary embodiments of the method and system of the invention can be used for a wide variety of substrates including heat sensitive substrates. Also, the method may be performed with less odour generation (of non polymerized monomers), less migration and less yellowing of ink layer due to a more efficient curing without having to change the ink formulation.

Figure 2:
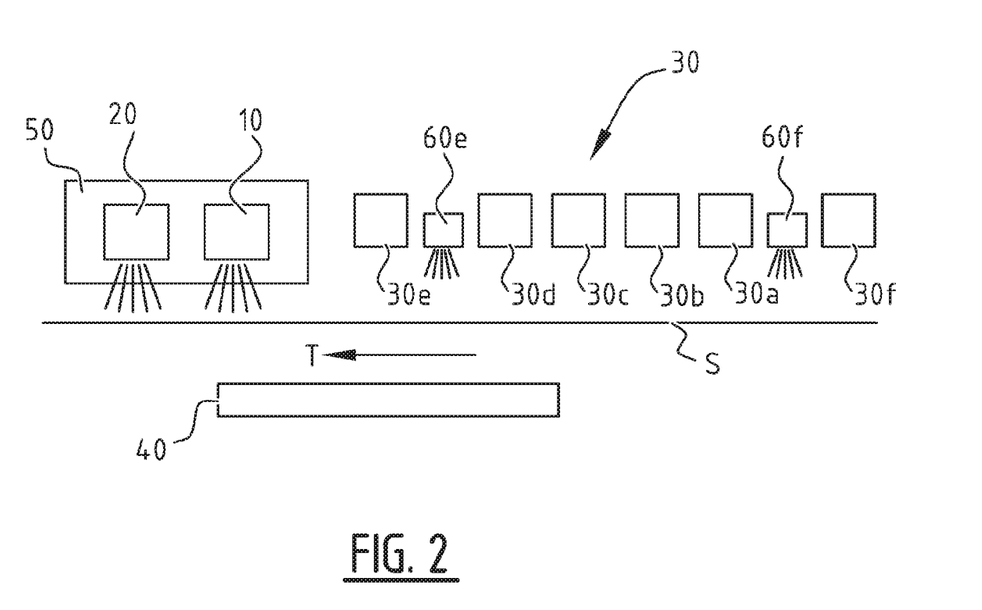
FIG. 2 is another schematic view of an inkjet printing system in accordance with another exemplary embodiment.

FIG. 2 illustrates another exemplary embodiment of the invention. The embodiment is similar to the embodiment of FIG. 1, with this difference that additional pinning devices 60e, 60f are provided, and that the print head assembly 30 comprises two print heads 30e, 30f configured for printing with white ink. In that manner, depending upon the final target image, opaque white can be applied first or last. The skilled person understands that further pinning devices may be provided between other adjacent print heads 30a-30d as well depending upon the spreading and wetting behaviour of the ink and surface energy of the substrate. The pinning devices 30e, 30f are configured for irradiating a partially formed actinic light sensitive inkjet layer using a radiation dose D3 of UV light which is suitable for substantially immobilizing the deposited inkjet droplets on the substrate. This will be a partial curing and not a full curing. Those pinning devices 60e, 60f may have a much lower power densities and doses, typical below 6 W/cm$^2$ and 30 mJ/cm$^2$, compared with the first curing device 10. The pinning devices 60e, 60f may be UV LEDs configured to emit UVA and/or UVV light.

Figure 3A:
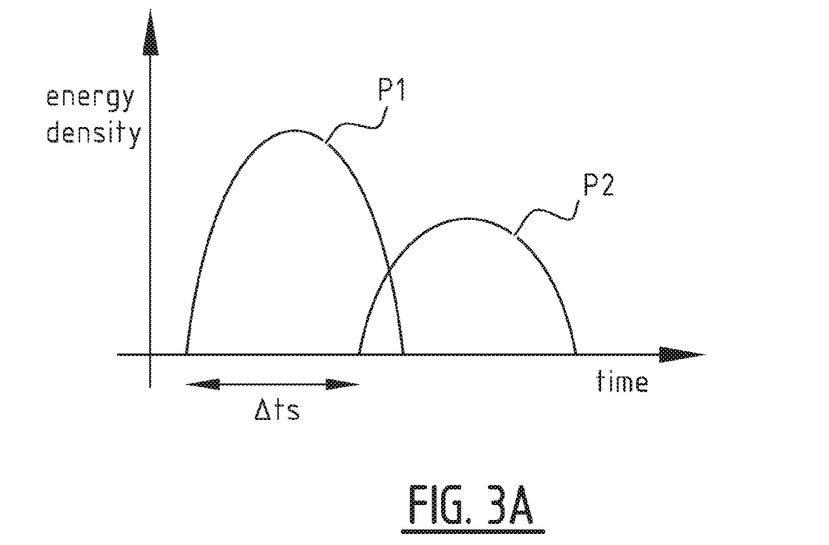
FIGS. 3A and 3B illustrate the power density on the substrate in function of time for the first and second curing device.
Figure 3B:
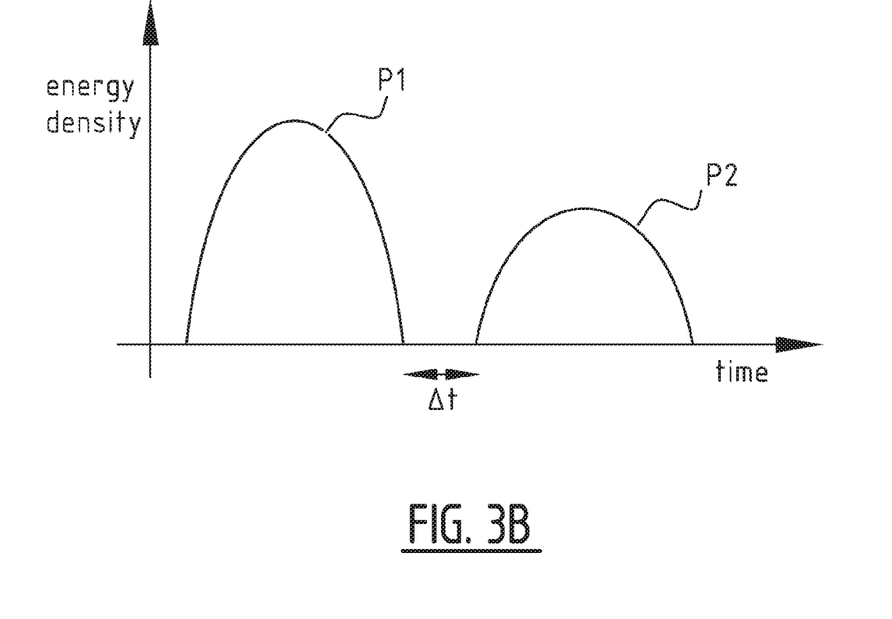

FIGS. 3A and 3B illustrate the energy density (dose) at a predetermined position on the substrate in function of time. P1 is the energy density of the first curing device 10 and P2 is the energy density of the second curing device 20. In the example of FIG. 3A, the irradiating by the second curing device 20 starts shortly before the irradiating of the first curing device is finished. Preferably the time period Dts between the start of the irradiating by the second curing device 20 and the start of the irradiating of the first curing device is at least 0.1 s.

In the embodiment of FIG. 3B, a small time interval $\Delta t$ between the finishing of irradiating by the first curing device 10 and the start of irradiating by the second curing device 20. Preferably, this period of time $\Delta t$ is small, more preferably smaller than 1 s, even more preferably smaller than 0.5 s. The first curing device 10 may emit the main portion of the first dose, whilst the second curing device 20, e.g. a discharge lamp may emit the second dose.

Other embodiments of the invention relate to electrophotographic processes operating with liquid toner (also called liquid toner dispersion) comprising carrier liquid and imaging particles (also called marking particles) which are supplied as solid particles suspended in a carrier liquid. The imaging particles may be chargeable colour pigments, chargeable coated colour pigments, chargeable toner particles with colour pigments, dyes. A dispersing agent, also called dispersant is added to the mix to avoid clustering of the imaging particles.

The liquid toner may be a liquid toner with an actinic light sensitive carrier liquid such as described in patent applications PCT/EP2017/059809 or NL 2016697 in the name of the applicant, which are included herein by reference, wherein photo-initiators are added to the carrier liquid to render the carrier liquid UV curable. The curable carrier liquid in a liquid toner according to the present invention can be any suitable carrier liquid having the desired conductivity and viscosity characteristics and capable of being UV cured to form a solid, see also the specific examples of suitable carrier liquids mentioned in PCT/EP2017/059809 or NL 2016697.

Also, the liquid toner may be a liquid toner with UV curable marking particles, wherein the carrier liquid is removed from the printed substrate. An example of such a toner is described in patent application NL2016429 in the name of the applicant, which is included herein by reference.

Figure 4:
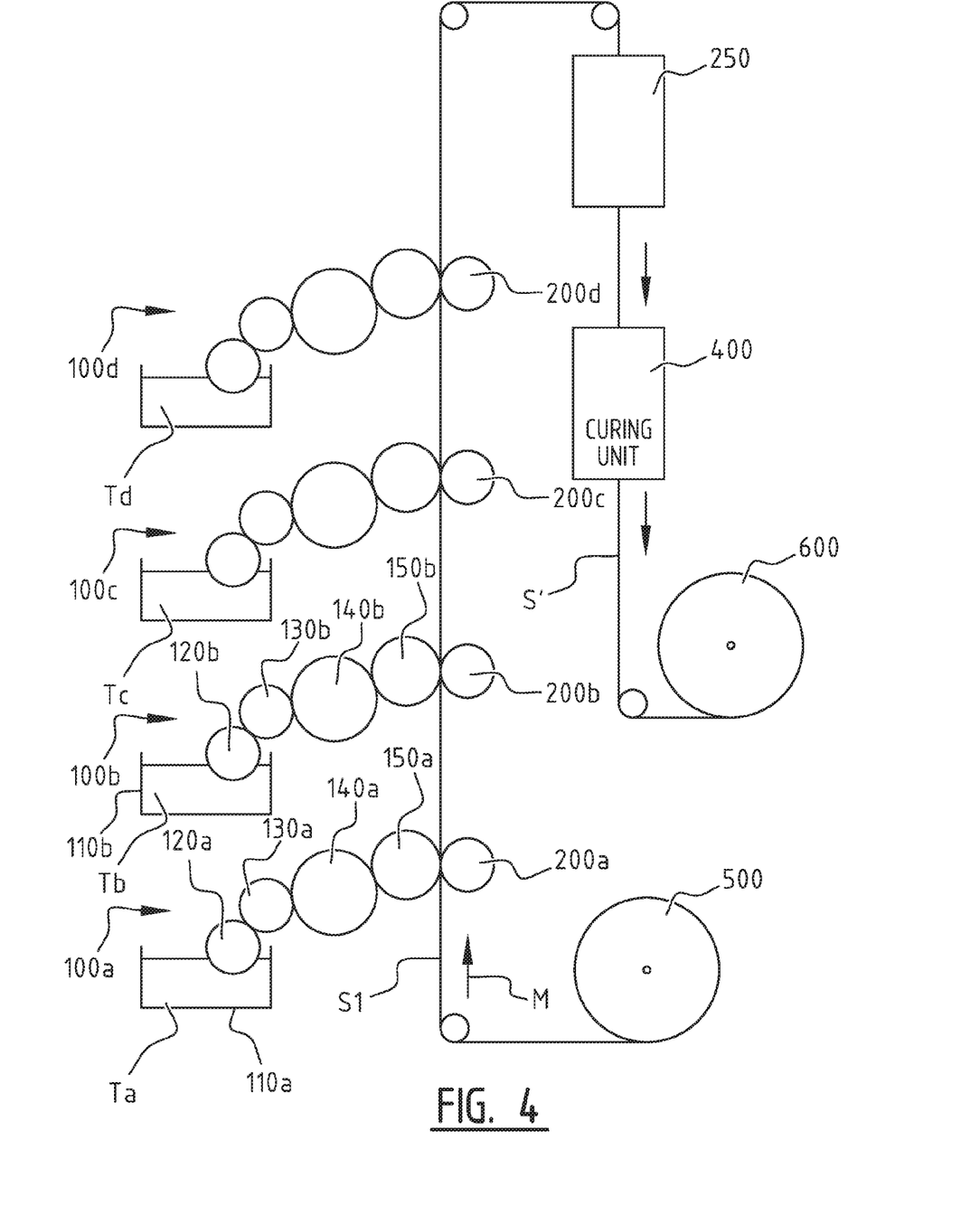
FIG. 4 is a schematic view of an exemplary embodiment of a liquid toner printing system in accordance with the invention.

FIG. 4 illustrates schematically an exemplary embodiment of a digital printing apparatus which may use liquid toner with UV curable carrier liquid and/or with UV curable imaging particles. The apparatus comprises a first image forming unit 100a for applying liquid toner Ta having a first colour, e.g. black, onto a first substrate S1, a second image forming unit 100b for applying liquid toner Tb having a second colour, e.g. cyan, onto the first substrate S1, a third image forming unit 100c for applying liquid toner Tc having a third colour, e.g. magenta, onto the first substrate S1, and a fourth image forming unit 100d for applying liquid toner Td having a fourth colour, e.g. yellow, onto the first substrate S1.

The first image forming unit 100a comprises a toner reservoir 110a, a feed member 120a, a first development member 130a, a first imaging member 140a, and an optional intermediate member 150a. The first imaging member 140a is adapted to sustain a first pattern of electric charge forming a first latent image on its surface. The first development member 130a is arranged to receive first liquid toner Ta from the feed member 120a, and to develop said first latent image by transferring a portion of said first liquid toner Ta onto first imaging member 140a in accordance with said first pattern. Similarly, the second image forming unit 100b comprises a toner reservoir 110b, a feed member 120b, a second development member 130b, a second imaging member 140b, and an optional intermediate member 150b. The second imaging member 140b is adapted to sustain a second pattern of electric charge forming a second latent image on its surface. The second development member 130b is arranged to receive second liquid toner Tb from the feed member 120b, and to develop said second latent image by transferring a portion of said second liquid toner Tb onto second imaging member 140b in accordance with said second pattern. The third and fourth imaging member 100c, 100d may be implemented in a similar manner. The first substrate S1 is supported on a substrate support assembly which comprises in the illustrated embodiment first, second, third and fourth support members 200a, 200b, 200c, 200d for supporting the first substrate S1 during the subsequent transfer of first, second, third and fourth liquid toner Ta, Tb, Tc, Td from the first, second, third and fourth image forming unit 100a, 100b, 100c, 100d, respectively, whilst the first substrate S1 moves in a movement direction M from the first image forming unit 100a to the fourth image forming unit 100d. This process results in a layer of liquid toner being applied to the first substrate S1.

Throughout the application, the various stages of the image forming units 100a, 100b, 100c, 100d and of the support assembly 200a, 200b, 200c, 200d have been described as members. These members may be rotating rollers, but the skilled person will appreciate that the same principles may be applied with other members, e.g. comprising a suitably designed rotating belt with a roll and/or a belt tracking shoe.

The digital printing apparatus further comprises a curing unit 400 configured for performing an irradiating step for curing the actinic light sensitive liquid toner layer by irradiating the formed actinic light sensitive liquid toner layer with a combination of a first radiation dose D1 in a first spectral range between 320 nm and 445 nm; followed by a second radiation dose D2 in a second spectral range between 200 nm and 319 nm. Preferably, the ratio of the radiation dose D11/D2 is between 0.25 and 500, more preferably between 0.25 and 200, even more preferably between 0.50 and 100. The curing unit 400 is arranged downstream of the print assembly seen in the transport direction. As in the above described embodiment of an inkjet printing system, the curing unit 400 may comprise a first curing device arranged for emitting a first irradiation onto the formed actinic light sensitive layer and a second curing device arranged for emitting a second irradiation onto the formed actinic light sensitive layer downstream of the first curing device, wherein the first curing device is configured to emit the first radiation dose, and the second curing device is configured to emit the second irradiation dose D2. The curing unit may have the same or similar properties as the curing unit described above for the inkjet printing system.

Optionally, there may be provided one or more units 250 upstream of the curing unit 400, such as a dispersion capacity modification unit and/or a fusing unit. An example thereof is described in patent application NL2016429 in the name of the applicant, which is included herein by reference.

Figure 5:
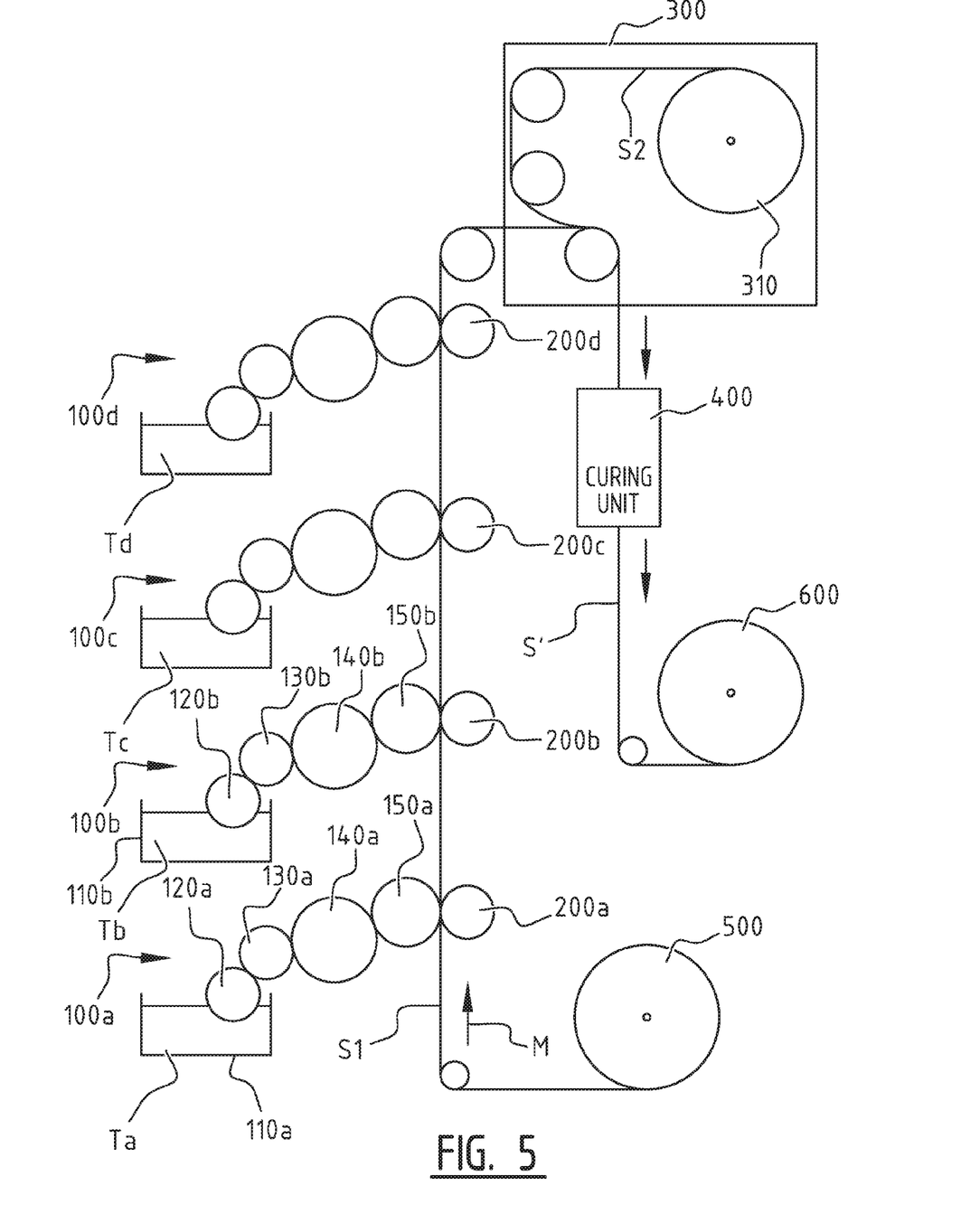
FIG. 5 is a schematic view of another exemplary embodiment of a liquid toner printing system in accordance with the invention.

FIG. 5 shows another possible exemplary embodiment of a printing system suitable for use with a liquid toner with a UV curable carrier liquid. The system is similar to the system of FIG. 4 with this difference that the digital printing apparatus further comprises a second substrate application unit 300 configured to apply a second substrate S2, e.g. a foil, on the transferred liquid toner on the first substrate S1. The curing unit 400 may be the same as in FIG. 4, and is configured to irradiate the transferred liquid toner through the second substrate S2 and/or through the first substrate S1 to cure the carrier liquid on and/or in the first substrate S1. When the first substrate S1 does not absorb the carrier liquid, the carrier liquid on the first substrate S1 is cured. When the first substrate S1 partially absorbs the carrier liquid, the carrier liquid on and in the first substrate S1 is cured. Also, when the carrier liquid is partially absorbed in the second substrate S2, the carrier liquid in the second substrate S2 is cured. In other words, preferably the resulting substrate S' (i.e. the first substrate S1 with the printed image beneath second substrate S2) does not contain any uncured carrier liquid.

It is noted that the first substrate S1 and/or the second substrate S2 may be transparent. For example, the first substrate S1 may be a non-transparent substrate and the second substrate S2 may be a transparent film. In this example the irradiating is preferably done through the second substrate S2. However, it is also possible to print on a thin transparent first substrate S1 and to irradiate through the first substrate S1. In such an embodiment the second substrate S2 may be non-transparent. The second substrate application unit 300 is arranged downstream of the image forming units 100a, 100b, 100c, 100d. Examples of suitable substrates are disclosed in PCT/EP2017/059809.

The curing unit 400 irradiates a first radiation dose D1 in a first spectral range between 320 nm and 445 nm; followed by a second radiation dose D2 in a second spectral range between 200 nm and 319 nm.

Optionally a fusing step which is applied downstream of the image forming units 100a, 100b, 100c, 100d may be omitted, if the curing unit 400 generates sufficient heat itself. However, it is still possible to perform a fusing step downstream of the image forming units 100a, 100b, 100c, 100d, before or after the second substrate application unit 300, e.g. to enhance the mixing of imaging particles of different colours.

The digital printing apparatus further comprises a first substrate feeding means 500 configured to feed the first substrate S1 as a continuous web during printing. Further the second substrate application unit 300 may be configured to apply the second substrate S2 as a continuous web during printing. The resulting substrate S' with the printed image beneath second substrate S2 may then be rolled on a roll 600.

Figure 6:
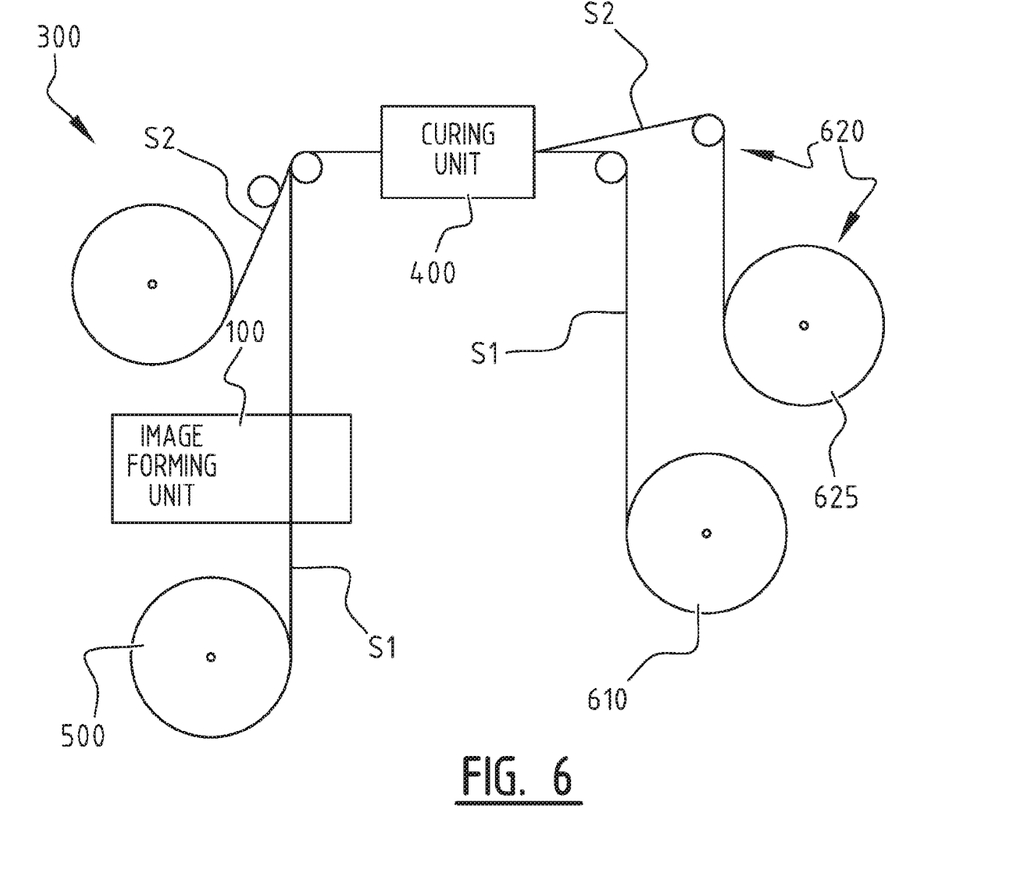
FIG. 6 is a schematic view of yet another exemplary embodiment of a liquid toner printing system in accordance with the invention.

FIG. 6 illustrates another exemplary embodiment of a digital printing apparatus of the invention in which components similar to the components of the embodiment of FIG.

5 have been indicated with the same reference numerals. The digital printing apparatus of FIG. 6 further comprises a second substrate removal means 620 downstream of the curing unit 400, and a first substrate winding means 610 downstream of the curing unit 400. The second substrate removal means 620 is configured to remove the second substrate S2 after curing. The first substrate winding means 610 is configured for winding the first substrate S1 with the cured liquid toner after removal of the second substrate S2 by the second substrate removal means 620. The second substrate removal means 620 comprises a second substrate reel spool 625 for winding the removed second substrate S2.

Figure 7:
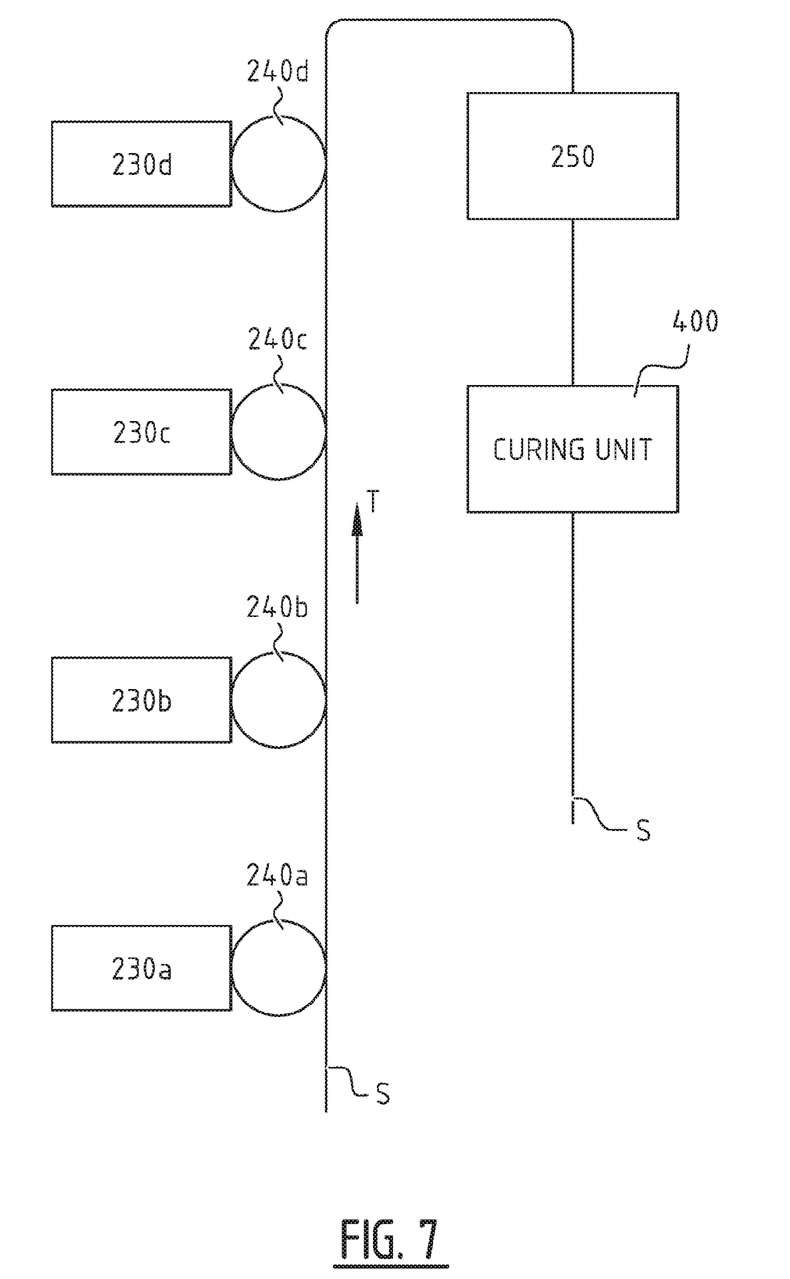
FIG. 7 is a schematic view of an exemplary embodiment of a dry toner printing system in accordance with the invention.

FIG. 7 illustrates an exemplary embodiment of a digital printing apparatus of the invention using dry toner. The printing system comprises different dry toner development units 230a, 230b, 230c, 230d to develop different colors onto a photoconductor 240a, 240b, 240c, 240d, respectively. Afterwards the developed image is transferred to the substrate S. In a next step the toner is fused onto the substrate S in a fusing device 250 which can be a non-contact type fusing unit or a contact-type fusing unit, or a combination of both. Preferably, the fusing unit is a contact type fusing unit. In a next stage the fused dry toner image is cured in a curing station 400 according to an embodiment of the present invention. Preferably the time between the fusing step and the curing step is short to achieve optimal curing.

Particular embodiments of the invention relate to the field of digital inkjet or toner printing apparatus and methods for so-called "continuous" webs (called substrate S in the text above), i.e. printing systems where a continuous roll of substrate (e.g., paper, plastic foil, or a multi-layer combination thereof) is run through the printer, in particular to print large numbers of copies of the same image(s), or alternatively, series of images, or even large sets of individually varying images.

of CMYK was visually evaluated when printing on a white substrate or when a transparent substrate is used, then the material is evaluated without backing on top of a white surface.
Evaluation:
1: not OK—clearly coloration observed
2: acceptable—very small coloration observed
3: very good: no coloration observed
Wrinkling
Wrinkling of the substrate caused by too high substrate temperatures is visually observed.
Evaluation:
1: not OK—wrinkling occurred
2: OK—no wrinkling

EXAMPLES

Samples were printed at a speed of 50 m/min with a web based print engine on a Fasson PP white substrate with UV curable cyan, magenta, yellow and black inks After the deposition of the ink a curing unit with a first curing device emitting a first radiation dose D1 in the 320-445 nm range followed by a second curing device emitting a second radiation dose D2 in the 200-319 mm range was put.

For samples 1-6, as a first curing device a Solidcure 2 HD device from ITL with a maximum power density of 24 W/cm$^2$ was used and as second curing device a 140 W/cm GEW mercury bulb was used.

In samples 7, 8 and 10 as a first curing device a Solidcure 2 HD device from ITL with a maximum power density of 24 W/cm$^2$ was used and as second curing device a 140 W/cm GEW mercury bulb was used.

In sample 9 the cure speed was 25 m/min instead of 50m/min and a iron doped bulb of 140 W/cm of GEW was used.

After the curing step the samples were evaluated for through and surface cure and wrinkling:

| sample | ex/com | D1 (UVA + UVB) mJ/cm$^2$ | D2 (UVB + UVC) mJ/cm$^2$ | dose 1/ dose 2 | through cure Y + K | surface cure | wrinkling |
|---|---|---|---|---|---|---|---|
| 1 | ex | 983.13 | 135 | 7.3 | 3 | 3 | 2 |
| 2 | ex | 983.13 | 40.5 | 24.3 | 3 | 2 | 2 |
| 3 | ex | 491.57 | 135 | 3.6 | 3 | 3 | 2 |
| 4 | ex | 196.63 | 135 | 1.5 | 2 | 3 | 2 |
| 5 | ex | 491.57 | 40.5 | 12.1 | 3 | 2 | 2 |
| 6 | ex | 98.31 | 135 | 0.7 | 2 | 3 | 2 |
| 7 | com | 0.00 | 135 | 0.0 | 1 | 3 | 2 |
| 8 | com | 30.00 | 135 | 0.2 | 3 | 3 | 2 |
| 9 | com | 0.00 | 230 | 0.0 | 2 | 3 | 1 |
| 10 | com | 983.13 | 0 | □ | 3 | 1 | 2 | ex: exemplary embodiment of the invention
com: comparative example

Test Methods

Through-Depth Cure

The through cure was evaluated by a scratch test performed according to Finat test method n° 29.

The scratching of the ink film describes the damage of an ink surface through mechanical means.

An sclerometer with a range of 0-10 N (red) is used to check the scratch resistance of overlay of yellow and black.
Evaluation:
1: 0-3N: not acceptable
2: 3.1-8.9N: acceptable
3: >9N: very good
Surface Cure The surface cure was visually evaluated. The offset/coloration in the area immediately after a multilayer image From the table it is clear that when no UVB and UVC is applied (sample 10), the ratio of D1/D2>500, and the surface cure is not acceptable. When the ratio of D1/D2<0.25 i.e. when no or too low first radiation dose D1 is applied (sample 7, 8 and 9) no acceptable through cure can be achieved. Sample 9 shows also that by increasing the dose and by using an Fe doped bulb the through cure can be improved but wrinkling becomes also unacceptable by the too high temperature of the substrate.

When the ratio of D1/D2 is in the range of 0.25 to 500 it is clear that surface cure as well as through cure are acceptable.

It will be appreciated by those skilled in the art that any block diagrams herein represent conceptual views of illustrative circuitry embodying the principles of the invention.

Whilst the principles of the invention have been set out above in connection with specific embodiments, it is to be understood that this description is merely made by way of example and not as a limitation of the scope of protection which is determined by the appended claims.

The invention claimed is:

1. A method for printing and curing of an actinic light sensitive ink or toner layer on a substrate comprising:
   a. moving a substrate in a transport direction along a print assembly;
   b. depositing by the print assembly of an actinic light sensitive ink or toner layer on the moving substrate; and
   c. downstream of the print assembly, seen in the transport direction of the substrate, irradiating the deposited actinic light sensitive ink or toner layer, with a first radiation dose D1 in a first spectral range between 320 nm and 445 nm; followed by a second radiation dose D2 in a second spectral range between 200 nm and 319 nm, wherein the ratio D1/D2 of the first radiation dose and the second radiation dose is between 0.25 and 500, more preferably between 0.25 and 200, even more preferably between 0.50 and 100; wherein the first radiation dose D1 is applied by using at least one UV-LED device; wherein the time between the first irradiation and the beginning of the second irradiation is smaller than 0.5 s or wherein the second irradiation starts before the end of the first irradiation.

2. The method of claim 1, wherein the first and the second dose are such that the ink or toner layer is fully cured.

3. The method of claim 1, wherein the first radiation dose D1 in the first spectral range comprises both UVA light and UVV light.

4. The method of claim 1, wherein the second radiation dose in the second spectral range comprises both UVB and UVC light.

5. The method of claim 1, wherein the irradiating step comprises a first radiation stage for applying the first radiation dose D1 and a second radiation stage for applying the second radiation dose D2; and wherein the first radiation stage starts earlier than the second radiation stage.

6. The method of claim 5, wherein the first radiation dose D1 of the first radiation stage is predominantly applied onto the actinic light sensitive ink or toner layer before a start of the second radiation stage.

7. The method of claim 5, wherein the second radiation stage starts during or substantially directly after the end of the first radiation stage.

8. The method of claim 1, wherein the irradiating step is performed while ambient air is present the actinic light sensitive ink or toner layer.

9. The method of claim 1, wherein the first radiation dose D1 is at least 30 mJ/cm$^2$; and/or wherein the second radiation dose D2 is at least 20 mJ/cm$^2$.

10. The method of claim 9, wherein a peak power density of the at least one UV-LED device at a front glass thereof is at least 10 W/cm$^2$, preferably at least 16 W/cm$^2$.

11. The method of claim 1, wherein the second radiation dose D2 is applied using a discharge lamp.

12. The method of claim 1, wherein the actinic light sensitive layer is an actinic light sensitive inkjet ink layer which is formed in a deposition step of positioning inkjet droplets onto the substrate before the irradiating step, the deposited inkjet droplets comprising at least one of cyan droplets, magenta droplets, yellow droplets, black droplets, and white droplets.

13. The method of claim 12, wherein the method further comprises a pinning step comprising irradiating a partially formed actinic light sensitive inkjet ink layer using a radiation dose D3 of UV light for substantially immobilising the deposited inkjet droplets on the substrate, which pinning step is performed in between a first deposition step of applying a first set of inkjet droplets having a first colour, onto the substrate and a second deposition step of applying a second set of inkjet droplets having a second colour onto the substrate, the second colour being different from the first colour.

14. The method of claim 1, wherein the actinic light sensitive ink or toner layer is a liquid or dry toner layer.

15. Use of an actinic light sensitive ink in a method of claim 1.

16. A printing system for printing and curing of an actinic light sensitive layer on a substrate comprising:
   a. a print assembly configured for depositing ink or toner onto the substrate thereby forming the actinic light sensitive layer on the substrate;
   b. a substrate transport mechanism for moving the substrate in a transport direction along the print assembly; and
   c. a curing unit configured for performing an irradiating step for curing the actinic light sensitive layer by irradiating the formed actinic light sensitive layer with a combination of a first radiation dose D1 in a first spectral range between 320 nm and 445 nm; followed by a second radiation dose D2 in a second spectral range between 200 nm and 319 nm, wherein the ratio of the radiation dose D1/D2 is between 0.25 and 500, wherein the curing unit is arranged downstream of the print assembly seen in the transport direction; wherein the curing unit comprises a first curing device arranged for emitting a first irradiation onto the formed actinic light sensitive layer and a second curing device arranged for emitting a second irradiation onto the formed actinic light sensitive layer downstream of the first curing device, seen in the transport direction of the substrate, wherein the first curing device is configured to emit the first radiation dose, and the second curing device is configured to emit the second irradiation dose D2; wherein the first curing device comprises at least one UV-LED device; wherein the first and second curing unit are arranged such that the time between the first irradiation and the beginning of the second irradiation is smaller than 0.5 s or such that the second irradiation starts before the end of the first irradiation.

17. The printing system of claim 16, wherein a peak power density of the at least one UV-LED device at a front glass thereof is at least 10 W/cm$^2$, preferably at least 16 W/cm$^2$.

18. The printing system of claim 16, wherein the second curing unit comprises a discharge lamp.

19. The printing system of claim 16, wherein the print assembly comprising at least one of a print head for depositing cyan droplets, a print head for depositing magenta droplets, a print head for depositing yellow droplets, a print head for depositing black droplets and a print head for depositing white droplets.

20. The printing system of claim 19, further comprising a pinning device configured for irradiating a partially formed actinic light sensitive layer using a radiation dose D3 of UV light for substantially immobilising the deposited ink on the substrate, which pinning device is arranged in between two subsequent print heads of the print assembly.

\* \* \* \* \*